(12) United States Patent
Bobier

(10) Patent No.: US 7,486,715 B2
(45) Date of Patent: Feb. 3, 2009

(54) NARROW-BAND INTEGER CYCLE OR IMPULSE MODULATION SPECTRUM SHARING METHOD

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 588 days.

(21) Appl. No.: 11/361,397

(22) Filed: Feb. 24, 2006

(65) Prior Publication Data

US 2006/0199542 A1   Sep. 7, 2006

Related U.S. Application Data

(60) Provisional application No. 60/657,917, filed on Mar. 2, 2005.

(51) Int. Cl.
*H04B 1/69* (2006.01)
(52) U.S. Cl. ...................... 375/130; 375/259
(58) Field of Classification Search ................. 375/130, 375/239, 259, 343, 350
See application file for complete search history.

(56) References Cited

U.S. PATENT DOCUMENTS

2002/0034268 A1* 3/2002 Miyanabe et al. ........... 375/340
2006/0078038 A1* 4/2006 McCorkle ................... 375/130
2006/0228118 A1* 10/2006 Schemmann et al. ........ 398/184

\* cited by examiner

*Primary Examiner*—Don N Vo
(74) *Attorney, Agent, or Firm*—Dennis L. Cook, Esq.

(57) ABSTRACT

A method of transmitting and receiving a narrow band integer cycle or impulse modulated signal for spectrum sharing comprising modulating a carrier with a first digital data stream using an integer cycle or impulse modulator then selecting a portion of the sideband of this RF modulated signal for transmission. Next modulating the carrier with a second digital data stream using an integer cycle or impulse modulator and selecting a different portion of the sideband of this second RF modulated signal for transmission. Finally combining and filtering the first and second RF modulated signals to remove all of the first and second RF modulated signals except the selected sideband portions and the carrier which creates a low power signal when transmitted. The transmitted signal is then demodulated through use of a wavelet pass filter which nulls all received RF signals except the low power RF signal when there is digital data present thus allowing for reconstruction of the first and second digital data streams.

6 Claims, 3 Drawing Sheets

Figure 5: transmitter architecture
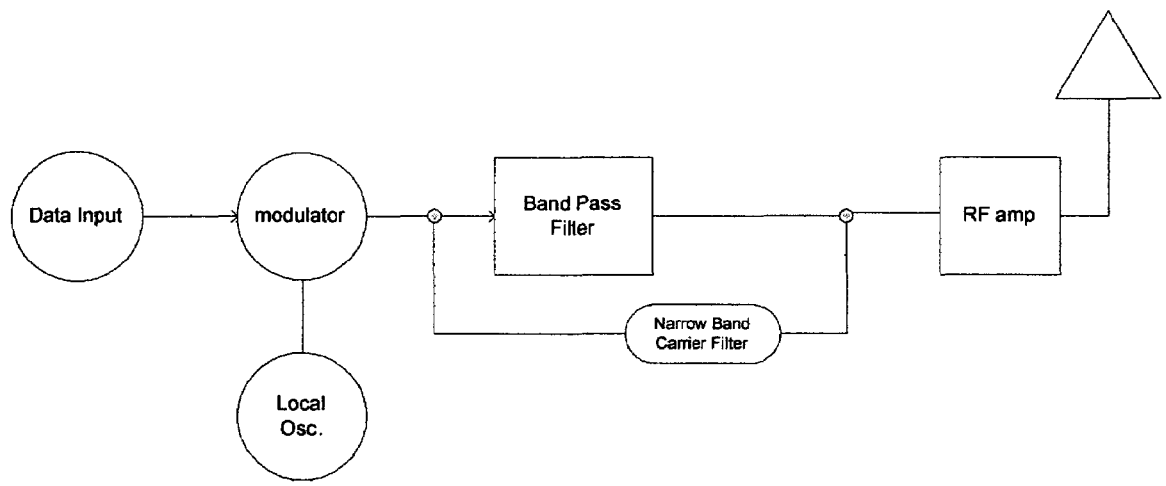
Figure 6: receiver architecture
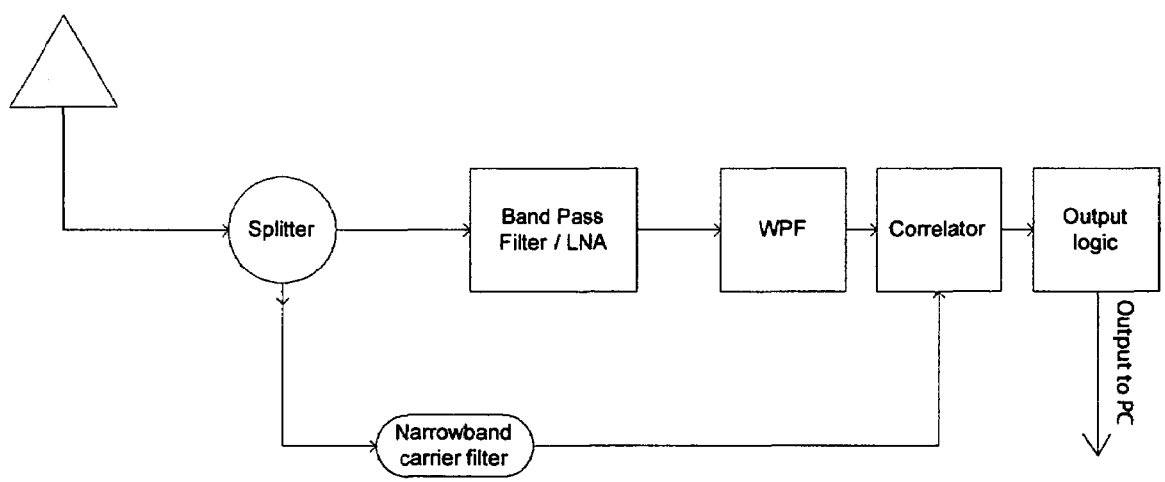

Figure 7: A PSD with the carrier located some distance from the information
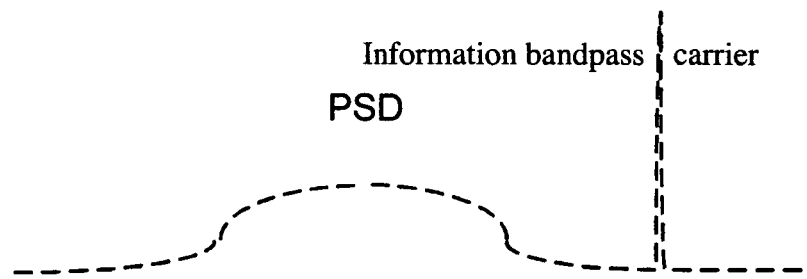
Figure 8: Dual Channel Narrowband Transmitter
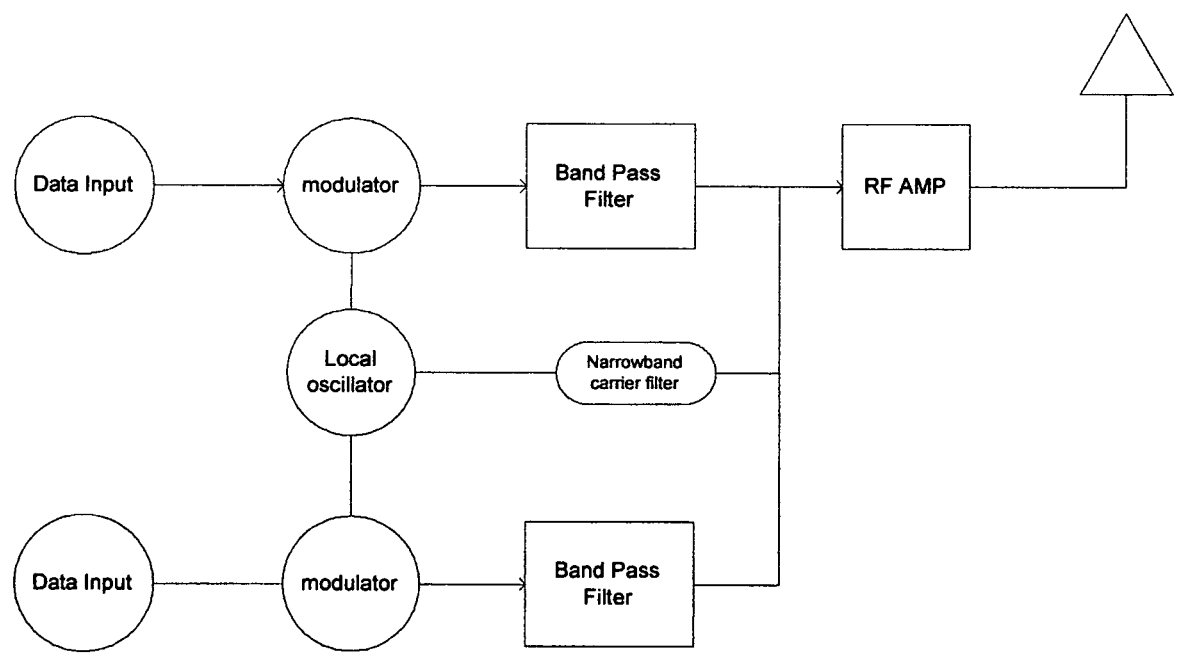

NARROW-BAND INTEGER CYCLE OR IMPULSE MODULATION SPECTRUM SHARING METHOD

CROSS-REFERENCE TO RELATED APPLICATION

The present application claims the benefit of previously filed Provisional Patent Application Ser. No. 60/657,917 filed Mar. 2, 2005

FIELD OF THE INVENTION

This invention addresses the need to transport high bit-rate data over wired or wireless means using specially modulated radio frequency carrier waves. Specifically, the invention provides a narrow band integer cycle or impulse modulation spectrum sharing method by which the spectral channel width occupied by the radio signal can remain very narrow even though the original power spectrum density of the modulated signal is very wide or even fits within the definition for Ultra-Wide-Band.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:
 1. Frequency Division Multiple Access (FDMA)
 2. Time Division Multiple Access (TDMA)
 3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

It is well known by those skilled in the art that a radio signal consists of at least one electromagnetic energy packet. These packets are comprised of both an electrical field and a magnetic field traveling through space. The mathematical description of each field is that of a sinusoidal shape, with each field conjoined in a transverse relationship, mutually dependant upon one another.

In the traditional usage, when these packets (photons) are generated together into a continuum of sequential sine waves, we have what is referred to as a radio carrier, which, if constituted of identical packets, is said to be un-modulated. For the radio spectrum to be pure, which consists of only one single and narrow radio channel when plotted on a spectral diagram, the packets are conjoined temporally so that as the phase angle of a preceding packet crosses the zero-degree end point, the proceeding packet is just beginning at the zero-degree angle. Thus from the perspective of the observer, a continuous 360 degree undulation of both electrical and magnetic fields would be observed.

Any radio system in use today will modify large groups of these conjoined packets in one or more ways to convey information. For example, a modern wireless phone might transmit near a frequency of 1.9 GHz and modulate the carrier at a rate of about 6 KHz to achieve a data throughput of 14.4 kbps. In this example, a portion of the carrier, consisting of about 316,366 individual sine waves is modified as a group to represent a single binary bit.

To represent the simplest form of communication, the binary system, there are several ways to alter at least one of the following four characteristics of the continuum of sine wave packets (referred to herein as sine waves) to indicate to the receiving mechanism that a binary one or zero is conveyed.

Sine waves can be modified in at least the following four basic ways:

1. Amplitude: The amplitude of the electrical and magnetic fields can be increased or decreased to cause either a larger or smaller signal to be detected at the receiving device. The change in amplitude can represent the conveyance of a binary one or a binary zero or even a change in binary state when the previous state is already known.
2. Frequency: The period of the individual sine waves within a group can be increased or decreased to make the same representation as in example one above. This is also called frequency modulation.
3. Interruption: The continuum of sine waves can be interrupted, then re-established to indicate a zero or one condition, or as in example one and two above, the interruption could represent a change in logic state assuming the previous state was known. This is sometimes known as CW or Pulse code modulation.
4. Phase: The phase of a group of sine waves could be altered so that the sine waves are in fact not sine waves any more. They now consist of an amalgamation of two or more frequencies, whose presence indicates the conditional change in logic state.

Many modulation techniques now exist that use any of the above methods either singularly or in combination. Lately a mixing of these methods has been in popular use because by modifying more than one characteristic, more than one single logic state can be represented. For instance the Quadrature Amplitude Modulation system (QAM) can combine the use of both amplitude and frequency modulation to represent multiple binary combinations.

Even though binary data stream transmission by wire has improved substantially in terms of data transfer rates, that improvement has not been the case where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

As discussed above it is well recognized by those skilled in the art that in modern radio communications a troubling problem exists in the utilization of spectrum. Many radio communication services exist to support the market needs of many diverse users. Government agencies regulate the usage of radio spectrum among such diverse users as government, military, private business, radio common carriers (RCC) and unlicensed individual users. The need for radio spectrum is an immense problem. The problem is compounded because modern radio systems transport binary digital information using modulation methods that are merely adaptations of methods that were originally designed for conveyance of analog information. Namely, voice, print, music and video transmissions, which were the sole forms of information in the 20th century, are now quickly being replaced with digital representations of the same. Added to this is the need to allow the user to access digital information from the Internet, corporate databases and other sources. Truly this is a modern problem. Since the means of modulating the radio carrier are still the same as those used in the past the amount of spectral width required by individual transmitters is ever increasing. Well-known theories of modulation define these modulation systems and dictate that as the amount of information increases in a given modulated stream, the number of spectral byproducts, called sidebands will increase. For instance, using common methods of radio modulation, a typical channel width for a digital transmission will be about ½ of the rate of binary state change. Applied in real terms, a radio transmitter that is conveying information at a rate of 100 kilobits per second (KBPS) will require a clear section of radio spectrum of about 50 KHz of width, with the carrier at the center of the channel. In this age, 100 KBPS is a low rate of data transmission, so in practice many services are requiring huge allocations of the limited spectrum resource.

A solution is required that will allow the maximum amount of information to be conveyed, while sharing the radio spectrum with other users.

Possible solutions that have emerged in recent years included monopulse and Ultra-Wide Band communication systems. The problem with these solutions is that all monopulse or Ultra-Wide Band communications systems form Power Spectrum Densities that tend to span very wide swaths of the radio spectrum. For instance the FCC has conditionally allowed limited power use of UWB from 3.2 GHz to 10 GHz. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver. Many schemes exist to mitigate the interference. Some of these include selective blocking of certain sections of spectrum so as not to hear the interferer, OFDM schemes that send redundant copies of the information in the hope that at least one copy will get through interference, and other more exotic schemes that require sophisticated DSP algorithms to perform advanced filtering. In addition, UWB systems have somewhat of a "bad reputation" because they at least have the potential to cause interference. A heated discourse has gone on for years over the potential that UWB systems can cause interference to legacy spectrum users.

Tri-State Integer Cycle Modulation (TICM) and other Integer Cycle Modulation techniques were designed by the inventor of this application to help alleviate this massive and growing problem. Its signal characteristics are such that absolute minimal sideband energy is generated during modulation but that power spectrum density is quite wide relative to the information rate applied. Therefore, a narrower section of the power spectrum output could be used to represent the same information as further disclosed below.

In the present invention, a novel solution is presented that will solve two problems facing UWB and any monocycle communications system. First, a method is presented to limit the bandwidth emission of these systems to a fraction of their usual bandwidth. Thus reducing the total power output of the transmitter and reducing the potential of interference to a small fraction of its former likelihood. Second, a method for receiving the narrowed signal, nulling narrowband interference and improving reception quality, despite the dramatic reduction in transmit power.

These methods, taken together create an opportunity to expand the use of UWB and other monocycle and monopulse systems to lower frequency portions of the spectrum where propagation characteristics are much more favorable, to create a multi-channel system where only a single channel system could exist previously and a method of using what are now narrowband, monocycle or monopulse systems to create a frequency division multiple access system.

In essence, it is an object of this invention to convert UWB systems into relatively narrow-band systems, while improving performance.

BRIEF SUMMARY OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006, filed by the inventor of this disclosure. A description of the TCIM technique follows:

The carrier wave consists of a continuum of sine wave RF cycles at a given fixed frequency. This frequency range can vary from low-frequency radio signals to high-frequency microwave.

All RF cycles are perfect sine waves.

Data is imposed upon the carrier wave by altering the base radio frequency of two sine waves of the continuum. A modulation event therefore consists of the frequency modification of two RF sine wave cycles (wavelets). Note that three (3), and only three (3) frequencies are needed for the TCIM modulation scheme. These three (3) frequencies can be extremely close (e.g. less than 30 Khz apart, which is a standard cellular channel) or significantly further apart, depending upon the ability of the receiver to differentiate the frequencies. The modulation can thus be thought of as performed on an integer cycle basis. The sequence of events in the formation of one modulation event are as follows;

Insert one sine wave cycle into the carrier cycle continuum that is higher in frequency than the carrier.

Follow the above cycle with another cycle that is lower in frequency than the carrier. Return to the carrier frequency for the next and all proceeding cycles.

Between the base frequency sine waves and the modulated (alternate) frequency sine waves, there is perfect phase continuity. That is to say, the altered frequency sine waves will begin exactly at the 360 degree zero crossing point of the preceding cycle, and will continue through 360 degrees to an end exactly at the zero degree, zero crossing point of the proceeding sine wave.

The difference in radio frequency between, base carrier cycles and modulation event cycles is arbitrary, only constrained by the ability of the de-modulator to reliably differentiate the two signals.

The receiver (de-modulator) need only compare the frequency (phase time) of the current sine wave to the previous sine wave to determine whether or not a modulation event has occurred.

Modulation systems working on integer cycle basis (like TICM—the method of modulation described above) modulate individual cycles of Radio Frequency (RF). While such systems can transmit data at a very high rate at relatively low (or high) frequency, it is nearly impossible to recover this modulated data using conventional Radio Frequency (RF) detection methods. The ability of radio receivers (using conventional detection methods) to detect integer cycle modulated signal is limited primarily because of group delay/impulsive response of the front-end pre-select filter and the demodulator itself. The front-end filter being a tightly tuned, high Q bandpass filter causes the integer cycle modulated signal to ring at a specific frequency therefore loosing all the information. While this problem can be overcome by inserting a low Q filter, at the cost of selectivity, the conventional detector itself being a slow device, relative to the individual RF cycle, cannot keep up with the fast changing pace of the integer cycle modulated signal. To efficiently recover modulated data from integer cycle modulated systems, a special demodulator is required that can work on an integer cycle basis in the presence of noise and strong competing signals. The Wavelet Pass Filter (WPF) as disclosed in U.S. patent application Ser. No. 11/142,519 published as US-2005-0276353-A1 filed by this inventor is the answer to such a need and the invention of this application uses the WPF in a unique method of spectrum sharing as will be more fully described below.

The WPF is a new form of demodulator that detects data in an integer cycle modulated signal in the presence of strong Additive White Gaussian Noise (AWGN) and strong competing signals.

The WPF works by canceling or nulling all the slow moving signals allowing only non-periodic signals (on integer cycle basis) to pass through it. This nulling effect results in a reduction of the interference from other signals thereby improving the signal to noise ratio of the system. When WPFs are stacked in series it allows the close frequency multiplexing implementation of integer cycle signals, which results in improving system capacity. Thus more channels can be placed in a given bandwidth without mutual interference. The basic idea is to get a flat nulling response within the pass band of the signal. So far multiple WPFs stacked in series has proven to be an ideal approach for obtaining such a flat nulling response.

The basic logic behind the WPF is to delay the incoming integer cycle modulated signal by a fixed amount and then sum the delayed signal with the non-delayed signal. For example, in case of periodic signals or slow moving signals or stationary signals, when such signals are delayed by integral multiples of their fundamental wavelength then the delayed signal and non-delayed signals (being a periodic signal that repeats after a fixed interval of time) have the same signal characteristics. After addition (or subtraction, whichever is required for a particular system), the resultant signal cancels or nulls itself out.

For example, consider an un-modulated carrier. Add the inverse of a cycle $_{T1}$ to cycle $_{T2}$. The result will be zero. However in the case of an integer cycle modulated carrier, cycle $_{T1}$ may be different in phase, frequency or amplitude than the cycle in time $_{T2}$. Thus the addition will result in a non-zero sum.

When such integer cycle modulated signals are passed through the WPF, the delayed signal is not equal to the non-delayed signal when there is data present. So the resultant signal does not cancel completely, thus, resulting in a demodulated signal that is present only as long as the data in present in the integer modulated signal. This nulling effect results in reducing the interference from other signals thereby improving the signal to noise ratio of the system. Thus WPF, not only reduces the interference from other channels, but it is a very fast demodulator that has the capability of demodulating the signal on an integer cycle basis.

The invention accordingly, comprises the methods possessing the steps of modulation, transmission, and reception, which are exemplified in the following detailed description.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 5 is a block schematic diagram of a transmitter;

FIG. 6 is a block schematic diagram of a receiver;

FIG. 7 is a representation of power spectrum density after filtering; and

FIG. 8 is a block schematic diagram of a dual channel transmitter.

DETAILED DESCRIPTION OF THE INVENTION

Figure 1:
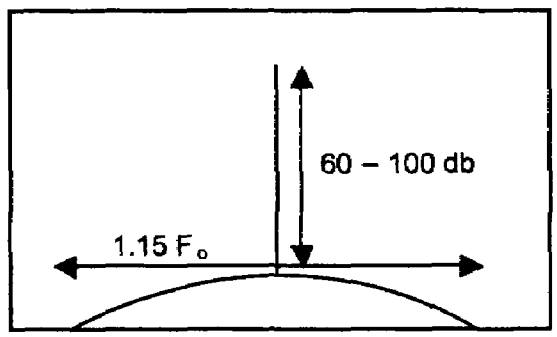
FIG. 1 is a representation of typical power spectrum density for UWB, integer-cycle or pulse modulated signal.

The invention disclosed in this application uses any integer cycle, ultra-wide band or impulse type modulation and more particularly is designed to work with a method of modulation named Tri-State Integer Cycle Modulation (TICM) which has been described above.

Modulation systems working on integer cycle basis (like TICM—the method of modulation described above) modulate individual cycles of Radio Frequency (RF) or transmit narrow pulses with or without a carrier. While such systems can transmit data at a very high rate, it is nearly impossible to recover this modulated data using conventional narrow-band Radio Frequency (RF) detection techniques such as heterodyne methods and balanced demodulators. The ability of radio receivers (using conventional detection methods) to detect integer cycle modulated signal is limited primarily because of group delay/impulsive response of the front-end pre-select filter and the demodulator itself. The front-end filter being a tightly tuned, high Q bandpass filter causes the integer cycle modulated signal to ring at a specific frequency therefore loosing all the information. While this problem can be overcome by inserting a low Q filter, at the cost of selectivity, the conventional detector itself being a slow device, relative to the individual RF cycle, cannot keep up with the fast changing pace of the integer cycle modulated signal. Likewise, such very wide-band communications systems typically are designed to share spectrum with many other users. These other users are therefore treated as interference or more correctly, interferers that must be ameliorated by the wideband receiver. To efficiently recover modulated data from integer cycle or other wideband modulated systems, a special demodulator is required that can work on an integer cycle basis in the presence of noise and strong competing signals. The Wavelet Pass Filter (WPF) as disclosed in U.S. patent application Ser. No. 11/142,519 published as US-2005-0276353-A1 filed by this inventor is the answer to such a need and the invention of this application uses the WPF in a unique method of spectrum sharing as will be more fully described below.

As discussed earlier, WPF delays the incoming signal by a fixed amount. The length of the delay is fixed for a particular system. For example if a component having a fixed delay, for example a coaxial cable, is used as a delaying element, then the length of the coaxial cable for the system is fixed and so will the delay of the system. This delay cannot be changed for the system. However, if programmable delay chips are used, then the lengths of the delay can be changed in accordance with the required specification of the system. Thus WPFs can be broadly classified into the following two main categories: Fixed Length WPF and Variable/Customize length WPF.

Fixed Length WPFs can further be subdivided into two categories: Full Wavelength WPF and Half Wavelength WPF It is further noted that there are many methods that can be used to cause signal propagation delay, coax being used as in the preferred embodiment described below. Other methods might include, strip line, waveguide, spatial separation and many other methods. No specific method is preferred for the sake of this disclosure.

Below is a detailed explanation of the workings of different types of WPFs.

In the case of the Full Wavelength WPF, the incoming integer cycle modulated signal is delayed by one full wavelength of its fundamental frequency. The delayed signal is then inverted and added to the non-delayed signal. As mentioned earlier, the WPF can be stacked in series to improve the overall bandwidth of the device and of the integer cycle modulated receiver. Thus λ-WPF can either be a single stage WPF or a multiple stages WPF, depending on the system requirements.

A single stage λ-WPF consists of three main blocks: The Delay Block, The Invert Block, and The Adder block The function of the delay block is to delay the incoming TICM (a type of integer cycle modulated signal) signal by one carrier cycle time. Thus the signal coming out of this block is a delayed replica of the incoming TICM Signal. For example if the center carrier frequency of the incoming TICM Signal is 170.6 MHz, then this delay block is set for 5.86166 nsec. This delay block could be a piece of coaxial cable, a micro-strip, or any programmable delay chip capable of delaying the signal by a required amount.

The Invert Block inverts the incoming delayed signal from the delay block. As a result of inversion, output signal is 180 degrees out of phase with respect to incoming delayed signal. The invert block could be implemented using a simple transformer.

The Adder block adds the inverted delayed TICM signal with the non-inverting non-delayed incoming TICM Signal. This adder block can be implemented using a number of methods for example a simple resistive adder, or an operational amplifier or with a transformer.

The Signal Splitter simply splits the incoming signal into two paths leading to delay—Invert block and to the adder block. (For example Mini-Circuits part number LRPS-2-1J)

As mentioned earlier, WPFs can be stacked in series to improve the nulling response of the system in terms of bandwidth to be nulled or the depth of nulling. This ultimately results in improving system capacity and at the same time helps improve signal to noise ratio. The choice of multiple WPFs depends upon the application and the specified bandwidth.

In the case of half wavelength (½λ) WPFs, the incoming integer cycle modulated signal is delayed by a half wavelength of the fundamental frequency. The delayed signal is then added to the non-delayed signal. Since this type of WPF does not require signal inversion, it results in less circuit components thereby reducing the overall cost and complexity of the system. The ½λ WPF consists of following main blocks: The splitter block, delay Block and The adder block The function of the delay block is to delay the incoming impulse or integer cycle modulated signal by half a carrier cycle time or ½ wavelength. Thus the signal coming out of this block is a ½λ-delayed replica of the incoming TICM Signal. Since this block delays the incoming signal by ½λ, the output signal is 180 degrees out of phase with respect to incoming signal. For example if the center carrier frequency of the incoming TICM Signal is 170.6 MHz, then this delay block is set for 2.930832 nsec. This delay block could be a piece of coaxial cable, a micro-strip, or any programmable delay chip capable of delaying the signal by a required amount.

The Adder block adds the inverted delayed TICM signal with the non-inverting non-delayed incoming TICM signal. This adder block can be implemented using a number of methods for example a simple resistive adder, or an operational amplifier or with a transformer or simply by using signal splitter configured in a signal combiner mode.

The Signal Splitter simply splits the incoming signal into two paths leading to the delay—Invert block and to the adder block.

The variable length wavelength WPF is a variable delay circuit and optionally a fixed delay circuit. The variable delay circuit delays each incoming frequency by a specific amount as dictated by the transfer function of the circuit, whereas the fixed delay circuit delays all the frequency components by the same fixed amount. The basic idea of this combination (variable delay and fixed delay) is that for any incoming frequency, the delay in the variable circuit plus, optionally, the delay in the fixed circuit is always equal to one wavelength or ½ wavelength of the incoming frequency. It is possible, depending upon the available variable delay circuits, that the fixed delay portion can be omitted if the variable delay provides adequate over-all delay.

The variable delay circuit can be implemented by using an All-Pass-Filter that has almost linear transfer characteristics whereas coaxial cable is used for implementing fixed delay circuit.

The delayed signal, after passing through the All Pass Filter and coaxial combination, is then inverted (in the case of the full wavelength version or not inverted in the case of the ½ wavelength version) and added to the non-delayed signal. Since all periodic, slow moving or stationary signals repeat after a fixed interval of time they cancel when they are compared with their own delayed version. Integer Cycle or impulse Modulated signals change on cycle-by-cycle basis, responsive to the modulated data, thus resulting in a demodulated signal when there is data present and canceling them out when there is no data present.

The variable delay version of the WPF consists of the following main blocks:

Signal Splitter Block: The Signal Splitter splits the incoming signal into two identical signals. One signal is applied to customize delay block while the other signal is applied to the adder block.

Customize Delay Block: The function of this block is to delay the incoming signal by a prescribed amount. The prescribed amount is set by the transfer function characteristics of the all pass filter. The All Pass Filter delays incoming signal frequencies by different amounts. The fixed delay block delays all the frequencies by the same amount. This is implemented by a number of ways, some of them being a piece of coaxial cable, or microstrip, or strip line or a trace or any fixed delay component. The object of the variable delay block is that for any incoming frequency, the delay in the All Pass Block plus the delay in the Fixed Delay Block is always equal to one wavelength of the incoming frequency. Thus signal coming out of this block will be one wavelength delayed as compared to the input signal regardless of the applied frequency. This is equivalent to the delay set up by Full wavelength WPF.

Signal Inversion Block: The purpose of this block is to invert the incoming signal coming out of the customize length block. This function could be implemented using just a transformer.

Signal Adder: This signal adds inverted delayed signal with non-inverted, non-delayed signal. This adder block can be implemented using a number of methods for example a simple resistive adder, or an operational amplifier or with a transformer or simply by using signal splitter configured in a signal combiner mode.

Likewise the variable delay version of the WPF can be configured as a ½λ WPF as easily as it can be used for a full wavelength version.

Given the above discussion it is important to note that the power spectrum density of a raw integer cycle or impulse signal is quite wide relative to the information rate applied. Therefore, it has now been discovered that a narrower section of the power spectrum density can be used to represent the same information.

All monopulse or Ultra-Wide Band communications systems form Power Spectrum Densities that tend to span very wide swaths of the radio spectrum. These systems must make use of very wide sections of radio spectrum because the transmit power in any narrow section of the spectrum is very low. Generally any 4 KHz section of the affected spectrum will contain no more than −42 dbm of UWB spectral power. Correlating receivers are used to "gather" such very wide spectral power and concentrate it into detectable pulses. Interfering signals are problematic. Since the communication system is receiving energy over a very wide spectrum, any interfering signal in that spectrum must be tolerated and mitigated within the receiver.

Tri-State Integer Cycle Modulation (TICM) and other Integer Cycle Modulation techniques were designed by the inventor of this application to help alleviate this massive and growing problem. It has now been discovered that an even narrower section of the power spectrum density could be used to represent the same information as further disclosed below. In the present invention, a novel solution is presented that will solve two problems facing UWB and any monocycle communications system. First, a method is presented to limit the bandwidth emission of these systems to a fraction of their usual bandwidth thus reducing the total power output of the transmitter and reducing the potential of interference to a small fraction of its former likelihood. Second, despite the dramatic reduction in transmit power, a method for receiving the narrowed signal, nulling narrowband interference, and improving reception quality is disclosed.

FIG. (1) shows an example power spectrum density of an integer cycle or impulse type RF signal. Since information is contained within any sub-section of the sideband curve, any sub-section could be portioned off to recover the information, assuming the following: The data rate must meet the Shannon criteria for signal to noise and the given sub-section bandwidth.

Historically, radio communications systems are designed and well understood in terms of signal to noise ratio (SNR). Performance of any system is usually explained in terms of the degree of error in the transmitted message where the amount of error is plotted in relationship to the nominal power of the signal to noise ratio. In systems where the message is digital, a common measurement of signal to noise ratio is bit energy/Noise density (Eb/No). In digital systems, the resulting plot is referred to as the BER or Bit Error Rate curve. All systems are modeled by comparing the nominal power of the signal to the noise power. Such systems are engineered to provide as much nominal signal power as possible in relationship to the noise power in the expected communications channel.

Claude Shannon developed a by now classical formulae that express the amount of information that can be transmitted through a communications channel given the bandwidth of the channel, the signal power and the noise power.

The Shannon capacity equation is described as $$C = B \cdot \log_2\left(1 + \frac{P}{N_o B}\right)$$

$$= B \cdot \log_2\left(1 + \left(\frac{E_b}{N_o}\right) \cdot \left(\frac{r_b}{B}\right)\right)$$

where
C: Shannon capacity in bits per second (bps).
B: Signal bandwidth.
P: Signal power.
$N_o$: One-sided noise spectral density.
$E_b$: Energy per bit.
$r_b$: Bit rate in bps.

The implication of the Shannon formula above is that as signal power increases or as noise power decreases, the allowable bit rate will increase. Engineers work diligently to design communications systems with the least noise and the maximum practical or allowed signal power in order to maximize the quality and speed of the information transmission.

Most radio communications systems, whether they are wired or wireless, have a maximum allowed nominal power or Effective Radiated Power (ERP). Thus it is frequently at this highest allowed limit that radio transmissions are transmitted. Unfortunately, in the case of a battery-powered device, transmitting at the highest power level also drains the battery most quickly. Another unfortunate effect is an increase in out of band emissions. These are strictly regulated, but even at the regulated levels these emissions are additive and pollute the radio spectrum. Out of band emissions tend to become additive and raise the common radio noise floor to ever-higher levels, which as indicated by Shannon's formula, reduces the capacity of any radio channel.

The present invention addresses this problem of accelerated battery drain and contribution to radio spectrum noise floor. And as we will show, the present invention can increase the range of digital radio systems by large distances over other systems operating with the same nominal power.

A common axiom in radio modulation technique design is that "A good modulation system moves as much power from the carrier to the sidebands as possible." In fact this has always been a good practice in terms of effectiveness. That is because the sidebands are known to carry the information while the carrier is considered to carry no information and used, perhaps, for synchronization and timing purposes. Therefore it is intuitive that maximum sideband power is desirable.

However the present invention seeks in many ways do the opposite. The intent is to produce as little sideband power as possible while maintaining a strong reception of the information.

In a traditional modulation system, as described above in the background of the invention, the carrier is frequency modulated at a maximum rate dictated by the channel bandwidth. For example, a 10 KHz tone modulates a 100 MHz carrier. The deviation, or amount of frequency change impressed by the modulating tone dictates the amount of power that is transferred from the carrier to the sidebands. The ratio of modulating cycles to the ratio of carrier cycles is 1:10,000. In other words, to transmit one cycle of an information tone, we modulated 10,000 carrier cycles by changing their frequency to something other than the original carrier frequency.

Other modulation systems can perform the modulation by changing other aspects of the carrier. For instance Amplitude Modulation (AM) changes the amplitude of the carrier signal at a rate equal to the modulating tone. The modulating tone to carrier frequency ratio would still be 1:10,000 given the same parameters and the result is a strong sideband.

Further levels of complexity also exist. Some modulation systems, known as high-order systems, combine various simpler systems such as frequency, phase and amplitude into more complex systems that allow more information to be represented in the same time period. The desired effect is to increase the information or bit rate that can move through the channel. However as Shannon would dictate, increasing the information rate also increases sensitivity to noise.

The present invention improves the system tolerance to noise by increasing the instantaneous amplitude of the information sideband or transmitted bit, thus creating a very strong sideband, but limits the duration of the sideband to an absolute minimum for each bit. Thus the very strong sideband can overcome noise more easily, albeit for a very brief period of time. While the previously mentioned methods of modulation clearly cause an effect on very large numbers of carrier cycles, thus producing sidebands that have a duration for as much time as the modulating tone, the present invention produces intense sidebands for extremely short periods of time involving very few RF carrier cycles.

One can easily see that high intensity sidebands, when produced for short periods of time, and given a low pulse repetition rate relative to the bandwidth of the communications channel, leads to a low nominal or average power output given the following formula: Pavg=Ppeak×Fp, where Pave is average pulse power, Ppeak is peak pulse power, and Fp is pulse repetition frequency.

Thus noise can be overcome by a brief pulse of high amplitude while another signal of much longer duration and more total power can be well below the noise floor, making it virtually un-detectable. Thus the power of the Integer Cycle signal is far less than a much longer duration signal. It is typical to find that the Integer Cycle signal peak power is about 40 db more than the Integer Cycle signal average power.

Thus we understand that it is possible to create a high-amplitude/short-duration signal that can rise above the noise floor, yet due to its short duration and low repetition rate the signal contains an average power that is much lower than the instantaneous peak power. Therefore, one can adjust the amplitude, pulse duration and the pulse repetition rate to control the average power. This provides a practical means of adjustment of the average power allowing the system to maintain a nominal power output at or below the regulated emissions. It also leads to practical spectrum sharing.

The short duration/high power pulse system thus far described has several variable factors that can be individually adjusted to suite a particular application. One of the adjustable attributes is the Pulse Repetition Rate (PRR). In systems with simple coding, also known as first order modulation systems, the modulation rate is the same as the bit rate. When considering a system like Integer Cycle modulation, in which low average power but high peak power is desirable, one must understand the relationship between the bit rate and the sideband power. In ultimate terms, it is most desirable to have the lowest possible average power with the highest possible peak power. That relationship is essentially described below.

The average sideband power will increase 3 db for each doubling of bit rate, all other variables held constant. The relationship can be expressed by the following equation.

$$P_{avg1} \cdot f_{p1} = \frac{P_{avg1}}{T_{p1}} = \frac{P_{avg2}}{T_{p2}} = P_{avg2} \cdot f_{p2}$$

where:
$P_{avg1}$: Average pulse power for System 1.
$P_{avg2}$: Average pulse power for System 2.
$f_{p1}$: Pulse repetition rate for System 1.
$f_{p2}$: Pulse repetition rate for System 2.
$T_{p1}$: Pulse repetition interval for System 1.
$T_{p2}$: Pulse repetition interval for System 2.

Thus this application discloses a signal topology that can improve the range of radio signals by concentrating power in brief but strong sidebands, which together with a pulse repetition rate can produce a radio signal with low average output power but high instantaneous power. These high powered instantaneous pulses can be much higher in intensity than pulses of a traditional system would form, making it easier to transmit a signal for which information portions are stronger than the noise floor.

Ordinarily it would be considered counter-intuitive to deliberately remove some or most of the sideband power from the transmitted PSD of a wideband signal. The reduction of transmitted sideband power would diminish the ability of the receiver to recover the signal. However, as the following will show, if the receiver noise is reduced as a percentage more than the signal power, the overall signal to noise ratio would improve, thus aiding reception. The invention of this instance, largely by use of a WPF, will reduce noise and interferer power by a degree greater than the decrease in signal power, resulting in an improvement in signal reception. Thus a communications system that would ordinarily rely upon a very wideband signal can instead use a relatively narrowband portion of radio spectrum with sideband power levels that are very low in the remaining sideband spectrum and essentially zero in the removed sideband spectrum.

Figure 2:
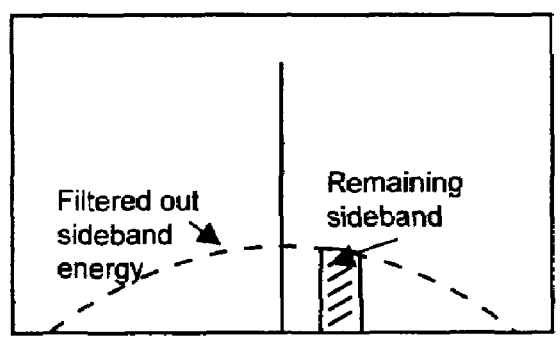
FIG. 2 is a representation of power spectrum density after band-pass filtering.
Figure 3:
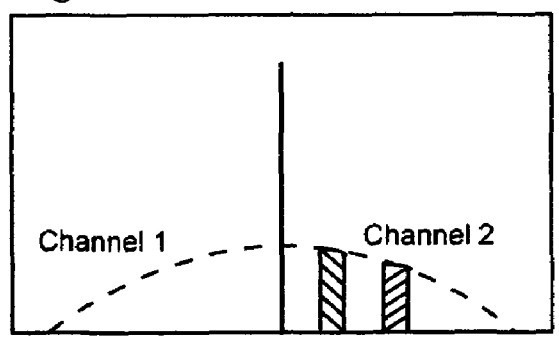
FIG. 3 is a representation of power spectrum density with two channels.
Figure 4:
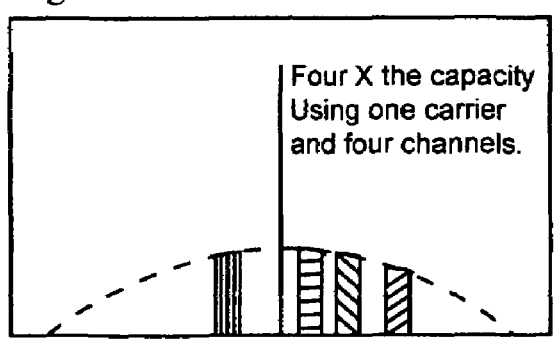
FIG. 4 is a representation of power spectrum density with four channels.

Suppose one were to pass an integer cycle transmitter signal through a filter to remove all but a section of the sideband. In this case assume the passed section is equal to 10% of the overall channel width. The power spread density looks like FIG. 2. Assuming $F_o$=170.0 MHz and apportioned sideband=10%. The approximate channel width is 19.5 MHz. (0.1($F_o$×1.15)). At a spectral efficiency of 2 Bits/Hz the capacity of the system is 39 Mbps. Spectral efficiency will necessarily vary with applied bit rate, signal/noise ratio and system needs.

As one can see from the figures the potential for interference to other users is zero except for the remaining sideband area, which is also low risk due to the low power. The total sideband power has been reduced, but the receiver noise power has been reduced to the same or an even greater degree. As long as the remaining sideband channel width is adequate for the applied bit rate and sufficient power exists, data can be recovered. See FIG. 7 also.

Now that so little channel width is used, the question becomes what to do with the rest of the channel width? If one adds another modulator to the same carrier source, one can now double the information rate assuming the second passed section of sideband energy is located at another distinct section of the radio spectrum.

Even though the carrier frequency is the same, there can be no symbol collision because the information exists in separate discrete frequency channels. Information is still correlated to the carrier frequency as usual. Use of this method of multi-channeling allows for throughput aggregation, multipath amelioration, and multi-user Frequency Division Multiplexing.

From FIG. 5, one can see that the carrier and information channels take different paths through the transmitter. The narrowband carrier filter will assure a clean and narrow carrier, while the band-pass filter in the information path will select the sideband portion that will actually be transmitted. Best results are obtained when the sideband section to be transmitted is selected in the upper 10 db of the unfiltered power spectrum density. However, with proper transmit signal processing, any area of the power spectrum could be used. The information path band-pass filter must be selected for adequate width relative to the anticipated maximum bit-rate to be transmitted. In the preferred embodiment a suggested bits/Hertz ratio for reliable communications and signal robustness is 1 bit/hertz. Thus a 10 MHz slice of transmitted sideband could yield 10 Mbps. Wider channels should be used for higher bit-rates unless a strong signal is assured.

Likewise the block diagram of FIG. 6 shows a different path for the receive information and the carrier. The receive information band-pass filter width and parameters should nearly match the filter used in the transmitter. The WPF should be designed somewhat wider than the band pass filter. For systems of only a small fractional bandwidth of the unfiltered integer cycle or impulse signal power spread density, say 10% or less, the preferred embodiment uses a three stage ½ wavelength coaxial type WPF in order to take advantage of the extremely deep nulling such a design affords. In most cases, only two or three poles are necessary to achieve uniform interferer nulling to a depth of more than 70 db.

Note that none of the spectrum sharing performance has been sacrificed. In fact, the ability to tolerate narrowband interferers has been dramatically increased because a much deeper nulling WPF is feasible given the narrower bandwidth to be nulled. In addition, simply by virtue of the narrower bandwidth being used, the likelihood for narrow band interferers to co-exist with our now decreased channel width is statistically decreased. WPFs that must cover many decades of spectrum typically have a nulling depth of 25 db to 35 db. By nulling to a depth of 70 db, reception interference by narrowband interferers is virtually eliminated.

In communications systems that use no carrier, for example pulse position or Ultra-Wide Band systems it is possible to not transmit the carrier at all by using a single band pass filter for the only for the sideband. The carrier would then be omitted from the amplification chain in the transmitter and the carrier recovery circuits in the reciever would not be used.

Since certain changes may be made in the above described RF signal modulation and reception method without departing from the scope of the invention herein involved, it is intended that all matter contained in the description thereof or shown in the accompanying figures shall be interpreted as illustrative and not in a limiting sense.

What is claimed is:

1. A method of transmitting and receiving a narrow band integer cycle or impulse modulated signal comprising:
    modulating a carrier with a digital data stream using an integer cycle or impulse modulator creating a RF modulated signal;
    selecting a portion of the sideband of said RF modulated signal;
    filtering said RF modulated signal to remove all of said RF modulated signal except said carrier and said selected sideband portion creating a low power RF signal;
    transmitting said low power RF signal;
    receiving said low power RF signal; and,
    demodulating said low power RF signal through use of a wavelet pass filter which nulls all received RF signals except said low power RF signal when there is digital data present on said low power RF signal resulting in a demodulated signal that is present only as long as the digital data is present on said low power modulated signal thus allowing for reconstruction of said digital data stream.

2. The method of claim 1 wherein band pass filters are used to filter said RF modulated signal.

3. The method of claim 1 wherein said carrier is also filtered and removed from said RF modulated signal.

4. A method of transmitting and receiving a narrow band integer cycle or impulse modulated signal for spectrum sharing comprising:
    modulating a carrier with a first digital data stream using an integer cycle or impulse modulator creating a first RF modulated signal;
    selecting a portion of the sideband of said first RF modulated signal;
    modulating said carrier with a second digital data stream using an integer cycle or impulse modulator creating a second RF modulated signal;
    selecting a different portion of the sideband of said second RF modulated signal;
    combining and filtering said first and second RF modulated signals to remove all of said first and second RF modulated signals except said carrier and said selected sideband portions creating a low power RF signal;
    transmitting said low power RF signal;
    receiving said low power RF signal; and,
    demodulating said low power RF signal through use of a wavelet pass filter which nulls all received RF signals except said low power RF signal when there is digital data present on said low power RF signal resulting in a demodulated signal that is present only as long as the digital data is present on said low power modulated signal thus allowing for reconstruction of said first and second digital data streams.

5. The method of claim 4 wherein band pass filters are used to filter said first and second RF modulated signal.

6. The method of claim 4 wherein said carrier is also filtered and removed from said first and second RF modulated signal.

* * * * *